(12) United States Patent
Abidin

(10) Patent No.: US 11,277,397 B2
(45) Date of Patent: Mar. 15, 2022

(54) METHOD AND SYSTEM FOR USER AUTHENTICATION

(71) Applicant: Authentico Technologies AB, Gothenburg (SE)

(72) Inventor: Aysajan Abidin, Heverlee (BE)

(73) Assignee: Authentico Technologies AB, Gothenburg (SE)

( * ) Notice: Subject to any disclaimer, the term of this patent is extended or adjusted under 35 U.S.C. 154(b) by 54 days.

(21) Appl. No.: 15/775,100

(22) PCT Filed: Nov. 11, 2016

(86) PCT No.: PCT/SE2016/051115
§ 371 (c)(1),
(2) Date: May 10, 2018

(87) PCT Pub. No.: WO2017/082808
PCT Pub. Date: May 18, 2017

(65) Prior Publication Data
US 2018/0332029 A1    Nov. 15, 2018

(30) Foreign Application Priority Data

Nov. 11, 2015 (SE) .................................... 1551459-9

(51) Int. Cl.
*H04L 29/06* (2006.01)
*H04L 9/08* (2006.01)
(Continued)

(52) U.S. Cl.
CPC .......... *H04L 63/0815* (2013.01); *G06F 21/32* (2013.01); *G06F 21/35* (2013.01);
(Continued)

(58) Field of Classification Search
CPC ............. H04L 63/0815; H04L 63/0884; H04L 63/0853; H04L 63/0861; H04L 9/3271;
(Continued)

(56) References Cited

U.S. PATENT DOCUMENTS 6,230,269 B1   5/2001 Spies et al.
7,123,721 B2 * 10/2006 Panjwani ........ H04W 12/04071
                                                                380/270

(Continued)

FOREIGN PATENT DOCUMENTS

| EP | 1760667 A2 | 3/2007 |
|---|---|---|
| WO | 03034655 A1 | 4/2003 |
| WO | 2006078561 A2 | 7/2006 |

OTHER PUBLICATIONS

IP.com search conducted Feb. 20, 2020.*

(Continued)

*Primary Examiner* — Taghi T Arani
*Assistant Examiner* — Blake I Narramore
(74) *Attorney, Agent, or Firm* — RMCK Law Group, PLC

(57) ABSTRACT

The present disclosure relates to a method for user authentication. In particular, the present disclosure relates to a computer implemented method for session based one-time authentication of a client operating an electronic device, typically using one of a biometric data relating to the user and/or information provided at a remote electronic device. The disclosure device server also relates to a corresponding authentication system and to a computer program product.

16 Claims, 4 Drawing Sheets

(51) Int. Cl.
*H04L 9/32* (2006.01)
*H04W 12/06* (2021.01)
*G06F 21/32* (2013.01)
*G06F 21/35* (2013.01)

(52) U.S. Cl.
CPC .......... *H04L 9/0866* (2013.01); *H04L 9/3271* (2013.01); *H04L 63/0853* (2013.01); *H04L 63/0861* (2013.01); *H04L 63/0884* (2013.01); *H04W 12/06* (2013.01)

(58) Field of Classification Search
CPC ... H04L 9/0866; H04L 9/3247; H04L 9/0861; H04L 9/3231; H04L 9/08; G06F 21/32; G06F 21/35; G06F 2221/2103; G06F 21/41; G06F 21/445; H04W 12/06
See application file for complete search history.

(56) References Cited

U.S. PATENT DOCUMENTS

| | | | | |
|---|---|---|---|---|
| 8,595,810 | B1* | 11/2013 | Ben Ayed | H04L 63/0815 726/8 |
| 2004/0218762 | A1* | 11/2004 | Le Saint | H04L 9/0825 380/277 |
| 2006/0015716 | A1* | 1/2006 | Thornton | H04L 9/3226 713/155 |
| 2006/0156012 | A1 | 7/2006 | Beeson | |
| 2007/0211891 | A1* | 9/2007 | Shamoon | H04L 63/0428 380/28 |
| 2008/0013724 | A1* | 1/2008 | Shamoon | H04N 21/44055 380/201 |
| 2010/0202609 | A1* | 8/2010 | Sandhu | H04L 9/0825 380/44 |
| 2012/0063594 | A1* | 3/2012 | Spalka | H04L 9/0836 380/44 |
| 2012/0331302 | A1* | 12/2012 | Eichholz | H04L 9/0844 713/182 |
| 2013/0046972 | A1* | 2/2013 | Campagna | H04L 9/0841 713/156 |
| 2014/0006784 | A1* | 1/2014 | Walker | H04W 12/06 713/169 |
| 2014/0108793 | A1 | 4/2014 | Barton et al. | |
| 2014/0129828 | A1* | 5/2014 | Rhee | H04L 9/3226 713/156 |
| 2015/0095999 | A1* | 4/2015 | Toth | H04L 63/061 726/6 |
| 2015/0195278 | A1 | 7/2015 | Plotkin et al. | |
| 2016/0013942 | A1* | 1/2016 | Nocera | H04L 9/30 713/155 |
| 2016/0139945 | A1* | 5/2016 | Griffith | G06F 8/63 711/162 |
| 2016/0189461 | A1* | 6/2016 | Kanon | H04L 63/061 705/51 |
| 2016/0381003 | A1* | 12/2016 | Caceres | H04L 63/0823 713/156 |
| 2018/0144310 | A1* | 5/2018 | Li | G06F 8/61 |

OTHER PUBLICATIONS

IP.com search query; Sep. 22, 2020 (Year: 2020).*
Extended European Search Report dated May 20, 2019 for EP Application No. 16864669.3, 10 pages.
International Search Report and Written Opinion for International Application No. PCT/SE2016/051115 dated Feb. 1, 2017, 15 pages.

* cited by examiner

METHOD AND SYSTEM FOR USER AUTHENTICATION

CROSS-REFERENCE TO RELATED APPLICATIONS

This application is a 371 U.S. National Stage of International Application No. PCT/SE2016/051115, filed Nov. 11, 2016, which claims priority to Swedish Application No. 1551459-9, filed on Nov. 11, 2015. The disclosures of each of the above applications are incorporated herein by reference in their entirety.

TECHNICAL FIELD

The present disclosure relates to a method for user authentication. In particular, the present disclosure relates to a computer implemented method for session based one-time authentication of a client operating an electronic device, typically using one of a biometric data relating to the user and/or information provided at a remote electronic device. The disclosure also relates to a corresponding authentication system and to a computer program product.

BACKGROUND OF THE INVENTION

At present, user information is distributed across many networks, websites and databases. For a user to access the available information, the user must issue separate sign-on commands for each specific system or application. This process is tedious for the user, specifically as to the necessity or remembering different logon procedures, often involving passwords. To keep the information as secure as possible, the passwords must be kept relatively complicated and changed regularly. This places the user under a significant burden to remember and maintain this information.

It would be quite beneficial to provide a single sign-on (SSO) tool to enable authorized users to perform one initial sign-on to access a variety of networks, systems and applications. A single sign-on system should provide secure handling of user passwords as well as support for multiple target logon methods, at least during a particular on-line session.

There today exist SSO tools for improving user access to a variety of networks, systems and applications. However, they are typically based on how to interact with the variety of networks, systems and applications. Accordingly, it would be desirable to also try to improve the general user handling of passwords, in a session environment, further improving the overall usability.

SUMMARY OF THE INVENTION

According to a first aspect of the disclosure, the above is at least partly met by a computer-implemented method for single sign-on of a user operating a client device connected to an authentication server using a network connection, the method comprising the steps of receiving, at the client device, a user specific data element, wherein the user specific data element comprises biometric data relating to the user, forming, at the client device, a key pair based on the user specific data element, a previously selected data element stored at the client device and an ID of the user, wherein the key pair comprises a public and a private key, and wherein the previously selected data element comprises information individually selected by the user, receiving, at the server, a request for authentication, transmitting, from the server to the client device, a challenge data element, signing, at the client device, the challenge data element using the private key, transmitting, from the client device to the server, a signed version of the challenge data element, and authenticating, at the server, the user by validating the signed version of the challenge data element using a previously stored public key relating to the user.

The present inventor has identified that it should be possible to form specific key pairs based on a data element specifically relating to the user. That is, the user is not expected to input a password but rather some form of user related information. The user related information could possibly be provided through a user interface of the client device, alternatively the user specific information could be provided by means of an electronic device connected to the client device as will be further discussed below in relation to the detailed description of the invention.

Furthermore, by means of the invention a user will be authenticated by means of a key pair that has a true connection to the user, wherein biometric data relating to the user connected to the user ID. In addition, the user individually selects a data element that is used for "defocusing" the biometric data. The key pair will be based on said true connection between the users ID and his biometric data, but without having to risk that the biometric data may be "extracted" out from the keys (that in some instances may be communicated in an unsafe environment).

The invention is typically at least partly performed in a web browser, functioning as a sign-on feature for allowing user access to a plurality of websites, at least during a predefined session length. Preferably, the generation of the key pair using the inventive method is re-initiated once the predefined session length has been preceded.

Preferably, the user specific data comprises biometric data relating to the user. The biometric data may for example relate to at least one of information relating to a fingerprint, an iris, a retina, a palm print, a voice print, DNA, and a handwritten signature, and behavioral biometrics for the user.

Advantages with the invention includes that the user does not have to remember any form of password to be allowed multi-site user access. Accordingly, the user related biometric data will be received once from the user, typically per session, to access the mentioned variety of networks, systems and applications.

In a possible embodiment of the present invention, it may be possible to form the key pair based on combination of the biometric data relating to the user and a user password. It may also be possible to introduce means for allowing either of the biometric data and the user password to in the end form an (essentially) identical key pair, meaning that the user may select to use either of the biometric data and the user password in the process of user authentication. Such an implementation will further allow the use biometric data as a "backup" in case of forgetting the user password, or using the biometric data if e.g. the fingerprint sensor is in some way malfunctioning.

Additionally, the disclosed embodiment will also allow for two-factor (or multi-factor if requesting a plurality of different types of biometric data, e.g. both face and fingerprint sensing) authentication to be implemented, whereby an extra layer of security is introduced such that the user has to enter both the user password and provide biometric data for allowing successful user authentication.

According to a second aspect of the disclosure there is provided an authentication system comprising at least a client device and an authentication server connected there-between using a network connection, the authentication system configured for single sign-on of a user operating the client device, the authentication system configured for receiving, at the client device, a user specific data element, wherein the user specific data element comprises biometric data relating to the user, forming, at the client device, a key pair based on the user specific data element, a previously selected data element stored at the client device and an ID of the user, wherein the key pair comprises a public and a private key, and wherein the previously selected data element comprises information individually selected by the user, receiving, at the server, a request for authentication, transmitting, from the server to the client device, a challenge data element, signing, at the client device, the challenge data element using the private key, transmitting, from the client device to the server, a signed version of the challenge data element, and authenticating, at the server, the user by validating the signed version of the challenge data element using a previously stored public key relating to the user. This aspect of the invention provides similar advantages as discussed above in relation to the first aspect of the disclosure.

In line with the above discussions, the server may form part of a client-server system, further comprising the plurality of client devices.

According to a third aspect of the disclosure there is provided a computer program product comprising a computer readable medium having stored thereon computer program means for a user operated client device and an authentication server in network connection there-between, wherein the computer program product comprises code for receiving, at the client device, a user specific data element, wherein the user specific data element comprises biometric data relating to the user, code for forming, at the client device, a key pair based on the user specific data element, a previously selected data element stored at the client device and an ID of the user, wherein the key pair comprises a public and a private key, and wherein the previously selected data element comprises information individually selected by the user, code for receiving a request for authentication, code for transmitting a challenge data element, code for signing the challenge data element using the private key, code for transmitting a signed version of the challenge data element, and code for authenticating the user by validating the signed version of the challenge data element using a previously stored public key relating to the user. Also this aspect of the invention provides similar advantages as discussed above in relation to the first and second aspects of the disclosure.

A software executed by the server for operation in accordance to the invention may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

According to a fourth aspect of the disclosure there is provided a computer-implemented method for single sign-on of a user operating a client device connected to an authentication server using a network connection, the method comprising the steps of forming, at the client device, a key pair based on a user password, a previously selected data element and an ID of the user, wherein the key pair comprises a public and a private key, and wherein the previously selected data element comprises information individually selected by the user, receiving, at the server, a request for authentication, transmitting, from the server to the client device, a challenge data element, signing, at the client device, the challenge data element using the private key, transmitting, from the client device to the server, a signed version of the challenge data element, and authenticating, at the server, the user by validating the signed version of the challenge data element using a previously stored public key relating to the user, wherein the previously selected data element is stored remotely from the client device.

This aspect relates closely to the first to third aspect of the invention. However, in this alternative implementation of the invention, the previously selected data element is stored remotely from the client device. That is, again there is no necessity for the user to remember a password.

Preferably, a hash version of the user password is may be stored at a dedicated electronic device configured specifically for secure connection to the client device. Possibly the secure connection may be wired or wireless. In a preferred embodiment the electronic device may be a mobile phone provided with a software application and/or a sensor for creating and storing the hash version of the password.

It would also be advantageous if the electronic device, e.g. the mobile phone, is further configured to receive (the original) user password from the user. The electronic device should then further be configured to communicate the previously selected data element to the client device upon a request from the client device. Such a request may for example be based on the user accessing a specific website, where the website in combination with the mentioned sign-on feature starts a secure communication link with the electronic device. In some embodiment the user password may be related to the previously selected data element.

According to a fifth aspect of the disclosure there is provided an authentication system comprising at least a client device and an authentication server connected there-between using a network connection, the authentication system configured for single sign-on of a user operating the client device, the authentication system configured for forming, at the client device, a key pair based on a user password, a previously selected data element and an ID of the user, wherein the key pair comprises a public and a private key, and wherein the previously selected data element comprises information individually selected by the user, receiving, at the server, a request for authentication, transmitting, from the server to the client device, a challenge data element, signing, at the client device, the challenge data element using the private key, transmitting, from the client device to the server, a signed version of the challenge data element, and authenticating, at the server, the user by validating the signed version of the challenge data element using a previously stored public key relating to the user, wherein the previously selected data element is stored remotely from the client device. Also this aspect of the invention provides similar advantages as discussed above in relation to the fourth aspect of the disclosure.

According to a sixth aspect of the disclosure there is provided a computer program product comprising a computer readable medium having stored thereon computer program means for a user operated client device and an authentication server in network connection there-between, wherein the computer program product comprises code for forming, at the client device, a key pair based on a user password, a previously selected data element and an ID of the user, wherein the key pair comprises a public and a private key, and wherein the previously selected data element comprises information individually selected by the user; code for receiving a request for authentication; code for transmitting a challenge data element; code for signing the challenge data element using the private key; code for transmitting a signed version of the challenge data element, and code for authenticating the user by validating the signed version of the challenge data element using a previously stored public key relating to the user, wherein the previously selected data element is stored remotely from the client device. Also this aspect of the invention provides similar advantages as discussed above in relation to the fourth and fifth aspects of the disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

Some portions of the detailed descriptions which follow are presented in terms of algorithms and symbolic representations of operations. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
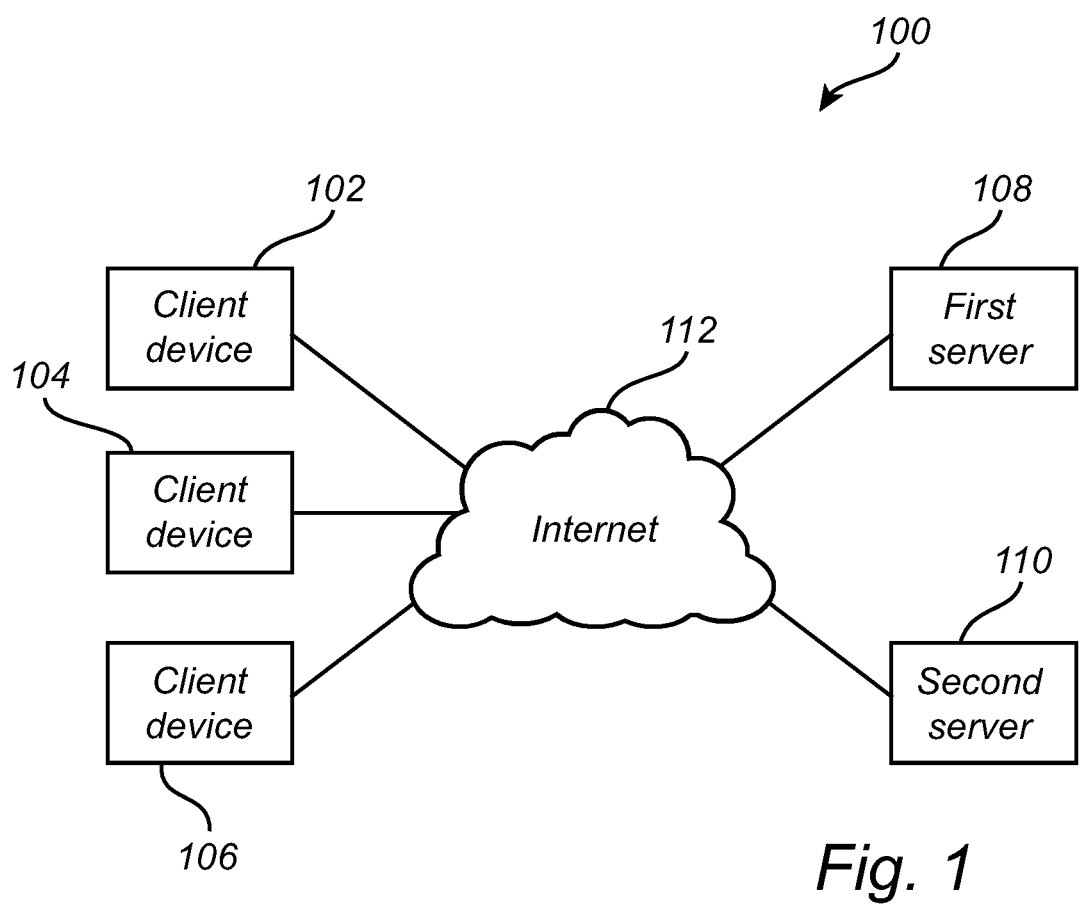
FIG. 1 conceptually illustrates a client-server environment where the present concept may be applied.

The present disclosure will now be described more fully hereinafter with reference to the accompanying drawings, in which example embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout Referring now to the drawings and to FIG. 1 in particular, there is depicted, conceptually, a client-server environment 100 where the present concept may be applied. The client-server environment 100 comprises a plurality of client device 102, 104, 106, a first 108 and a second 110 server, where the client devices 102, 104, 106 and the servers 108, 110 are connected by means of network connection, such as over the Internet 112.

As discussed above, the client devices 102, 104, 106 may for example include mobile phones, desktop computers, laptops, tablets, etc. each provided with a web browser. During operation the individual users of the of the client devices 102, 104, 106 may have a desire to access privileged information requiring. To access the information, a client device such as client device 102 is authenticated using a challenge-response authentication schema applied in line with the inventive concept.

Figure 2A:
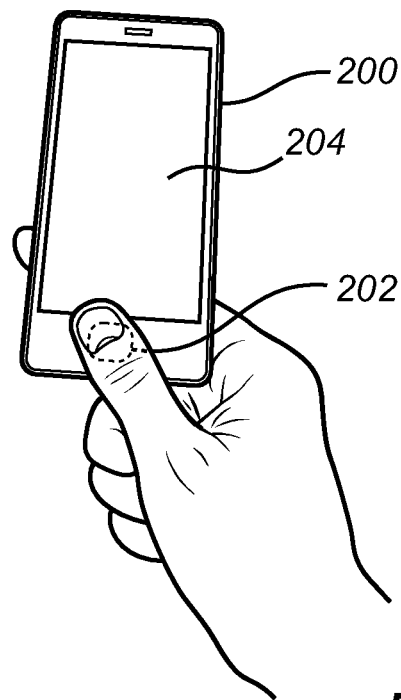
FIGS. 2A and 2B illustrate exemplary set-ups for operating the different embodiment of the invention.
Figure 3A:
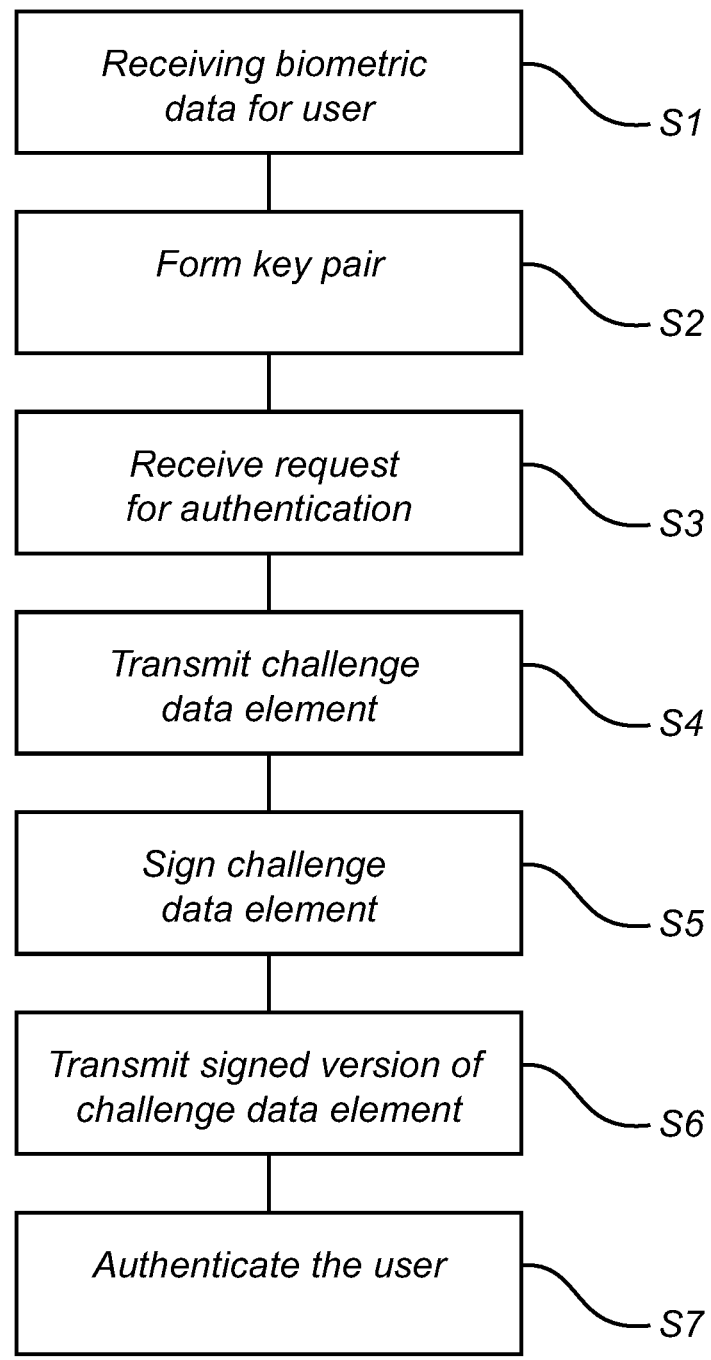
FIGS. 3A and 3B provides flow charts showing the method steps according to currently preferred embodiments of the invention

In accordance to the invention, with further reference to FIGS. 2A and 3A, there is exemplified a first possible implementation of the invention. A client device, such as being a mobile phone 200, will be provided with means for acquiring a user specific data element, specifically representing the user of the client device 102. The user specific data element preferably comprises biometric data relating to the user. For example, a fingerprint sensor 202 may be integrated with the mobile phone 102 and configured to acquire a fingerprint of the user of the mobile phone 102, to be received, S1, as an input to a software application performed at the mobile phone 102, by a control unit, as will be further elaborated below. Other types of sensor and/or other means are possible and within the scope of the invention, for example sensors and/or other means for acquiring information relating to an iris, a retina, a palm print, a voice print, DNA, a handwritten signature, and behavioral biometrics for the user. The mobile phone 200 is provided with a graphical user interface (GUI) 204 for providing instructions to the user.

Once the software application of the mobile phone 200 has received the fingerprint, a key pair is formed based on the fingerprint, a previously selected data element stored at the client device and an ID of the user. The key pair comprises a public and a private key. The previously selected data element may for example be a preselected random bit string. The ID of the user may for example be an email address preselected by the user.

Following the formation of the key pair, the user of the mobile phone 200 e.g. navigates to a web address of first server 108, with the purpose of accessing the privileged information at the first server 108. The first server 108 receives, S3, the request for authentication and transmits, S4, a challenge data element back to the mobile phone 102. The mobile phone 200 automatically signs, S5, the challenge data element using the private key and transmits, S6, the signed version of the challenge data element to the first server 108.

In accordance to the invention, the public key of the key pair and relating to the biometric data for the user has previously been distributed, e.g. to the first 108 and the second server 110. In the first server 108 with the purpose of accessing the privileged information at the first server 108, the first server 108 uses the public key to determining the validity of the previously received signed version of the challenge data element. If it is determined that the challenge data element is validly signed, the user is authenticated, S7. As understood, the private and public key (of the key pair) may be formed and used according to any known public key algorithm.

As understood from the above, the user will not only be authenticated based on a ID and a password, but rather a "true" connection to the user will be given as the authentication will be based on biometric data relating to the user.

In addition to the above, by means of forming and using a combination of a key pair and a challenge scheme, the user will readily be allowed access also to the second server 110, i.e. without having to resort to proceeding through all steps as listed above. Rather, following a further request for authentication received at the second server 110, the mobile phone 200 will sign (using the private key) a received challenge data and provide a signed version of the same back to the second server 110. Also the second server 110 may then authenticate the user using the public key previously provided. Accordingly, it may not even be necessary for the user to once again provide a fingerprint for accessing the second server 110, a single sign-on procedure is provided. It should however be understood that the key pair may be formed with a predetermined lifetime, for example using a session based approach as is known in the art.

It should be understood that the sensor 202 may be arranged differently than what is exemplified in the disclosed embodiment. For example, in case of a client device being a laptop, a fingerprint may be provided using a fingerprint sensor integrated with the laptop, or using a mobile phone e.g. wirelessly connected to the laptop, where instead the mobile phone is provided with the fingerprint sensor. The e.g. wireless connection between the laptop and the mobile phone is preferably arranged in a secure manner such that the information relating to the fingerprint is securely handed from the mobile phone to the laptop.

Figure 2B:
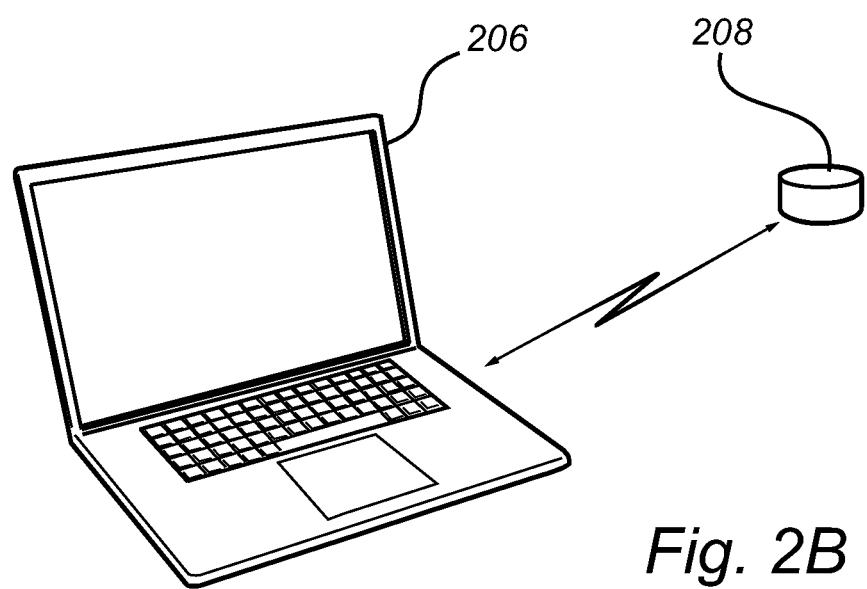
Figure 3B:
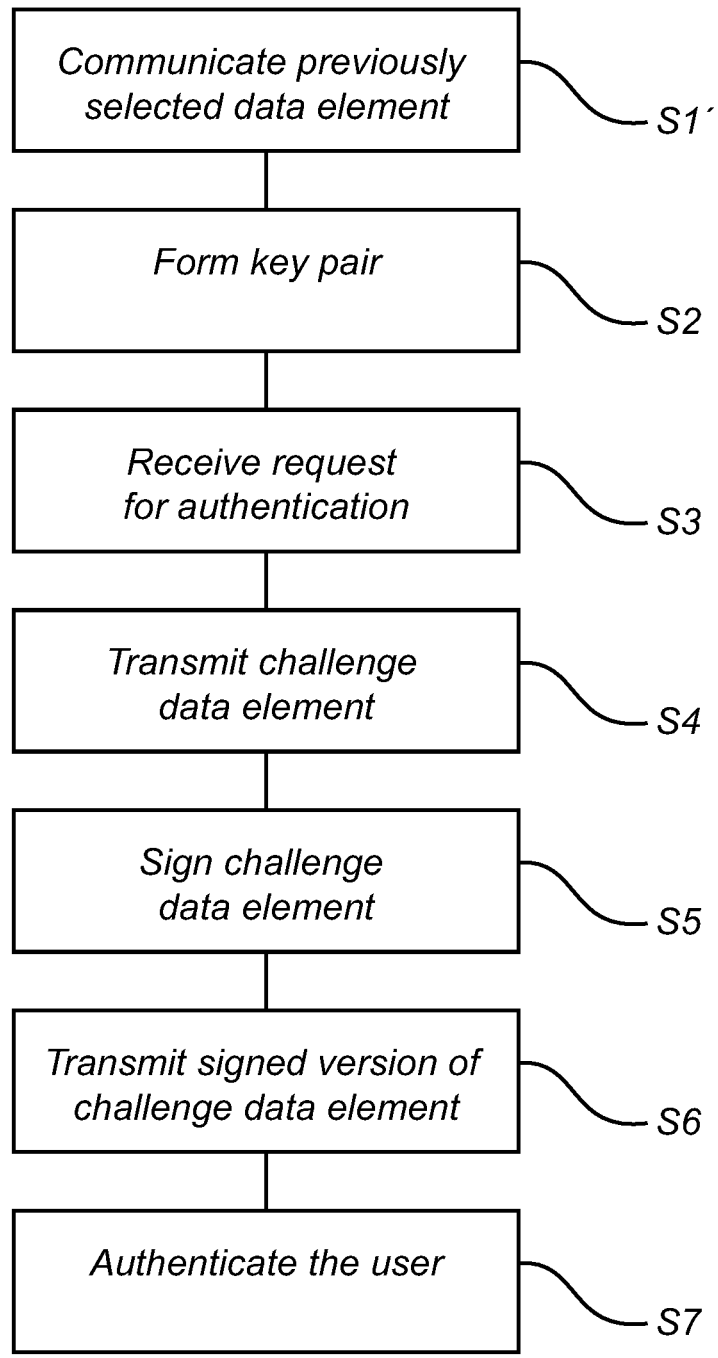

With further reference to FIGS. 2B and 3B, there is exemplified a second possible implementation of the invention. In this embodiment, a client device, such as a laptop 206 is used by a user with the purpose of accessing privileged information at the first server 108. The second possible implementation of the invention is similar to the description provided above in relation to the first possible implementation of the invention. However, rather than receiving a piece of biometric data representing the user, the user is provided with an electronic device 208 configured to communicate S1' the previously selected data element to the client device upon a request from the laptop 206. Hence, the electronic device 208 will be individually provided with the user and used for authentication purposes. The electronic device 208 may for example be wirelessly connected to the laptop 206. However, the electronic device 208 could be e.g. a USB based device to be inserted in a USB port of the laptop 206.

In a possible implementation of the invention, the electronic device 208 may be a mobile phone in the ownership by the user.

The previously selected data element will in this case be a piece of information individually selected by the user. Such information could be based on a random sequence formed for or by the user. The information could possibly relate to biometric information for the user.

The step of communicate S1' the previously selected data element to the client device is in some sense corresponding to the step S1 as presented in FIG. 2A. Accordingly, the following steps S2-S7 in the second possible implementation will essentially correspond to the steps S2-S7 discussed above and shown in FIG. 2A.

However, as it is advantageous from a security perspective that the user keeps the electronic device 208 in his own possession at all times, it may be possible to control the laptop 206 such that authentication is not allowed in case the electronic device 208 is not connected to the laptop 206. That is, in case the electronic device 208 is a mobile phone e.g. connected to the laptop over a wireless Bluetooth connection, in case the user brings his mobile phone away from the laptop 206 and hence breaks the wireless Bluetooth connection, further access (e.g. to the first and/or the second server 108, 110) is no longer allowed. Other types of connections are of course possible, including e.g. an NFC connection, Zig-Bee, Wi-Fi, or any other type of "near" connection.

The present disclosure contemplates methods and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer-implemented method for single sign-on of a user operating a client device connected to an authentication server using a network connection, the method comprising the steps of:
   receiving, at the client device, a user specific data element, wherein the user specific data element comprises biometric data relating to the user;
   forming, at the client device, a key pair based on the user specific data element, a previously selected data element stored at the client device and an ID of the user, wherein the key pair comprises a public and a private key, wherein the previously selected data element comprises a random bitstring individually selected by the user, and wherein the key pair has a preselected lifetime;
   receiving, at the server, a request for authentication;
   transmitting, from the server to the client device, a challenge data element;
   signing, at the client device, the challenge data element using the private key;
   transmitting, from the client device to the server, a signed version of the challenge data element; and
   authenticating, at the server, the user by validating the signed version of the challenge data element using a previously stored public key relating to the user,
   wherein the forming of the key pair is re-initiated once the preselected lifetime has been preceded.

2. The method according to claim 1, wherein the biometric data relates to at least one of information relating to a fingerprint, an iris, a retina, a palm print, a voice print, DNA, a handwritten signature, and behavioral biometrics for the user.

3. The method according to claim 1, further comprising wirelessly connecting an electronic device to the client device, wherein the electronic device is provided with a software application and/or a sensor for collecting the biometric data and for providing the biometric data to the client device.

4. The method according to claim 1, further comprising the step of:
   registering the user at the server by providing the ID of the user and the public key from the client device to the server.

5. The method according to claim 2, wherein the user specific data element comprises a combination of the biometric data relating to the user and a user password.

6. An authentication system comprising at least a client device and an authentication server connected there-between using a network connection, each of the client device and the authentication server including one or more hardware processors, the authentication system configured for single sign-on of a user operating the client device, the authentication system configured for:
   receiving, at the client device, a user specific data element, wherein the user specific data element comprises biometric data relating to the user;
   forming, at the client device, a key pair based on the user specific data element, a previously selected data element stored at the client device and an ID of the user, wherein the key pair comprises a public and a private key, wherein the previously selected data element comprises a random bitstring individually selected by the user, and wherein the key pair has a preselected lifetime;
   receiving, at the server, a request for authentication;
   transmitting, from the server to the client device, a challenge data element;
   signing, at the client device, the challenge data element using the private key;
   transmitting, from the client device to the server, a signed version of the challenge data element; and
   authenticating, at the server, the user by validating the signed version of the challenge data element using a previously stored public key relating to the user,
   wherein the forming of the key pair is re-initiated once the preselected lifetime has been preceded.

7. The method according to claim 1, wherein the previously selected data element is based on a random sequence formed for the user.

8. The authentication system according to claim 6, wherein the previously selected data element is based on a random sequence formed for the user.

9. A computer program product comprising a non-transitory computer readable medium having stored thereon computer program means for a user operated client device and an authentication server in network connection there-between, wherein the computer program product comprises:
   code for receiving, at the client device, a user specific data element, wherein the user specific data element comprises biometric data relating to the user;
   code for forming, at the client device, a key pair based on the user specific data element, a previously selected data element stored at the client device and an ID of the user, wherein the key pair comprises a public and a private key, wherein the previously selected data element comprises a random bitstring individually selected by the user, and wherein the key pair has a preselected lifetime;
   code for receiving a request for authentication;
   code for transmitting a challenge data element;
   code for signing the challenge data element using the private key;
   code for transmitting a signed version of the challenge data element; and
   code for authenticating the user by validating the signed version of the challenge data element using a previously stored public key relating to the user,
   wherein the forming of the key pair is re-initiated once the preselected lifetime has been preceded.

10. A computer-implemented method for single sign-on of a user operating a client device connected to an authentication server using a network connection, the method comprising the steps of:
    forming, at the client device, a key pair based on a user password, a previously selected data element and an ID of the user, wherein the key pair comprises a public and a private key, wherein the previously selected data element comprises a random bitstring individually selected by the user, and wherein the key pair has a preselected lifetime;

receiving, at the server, a request for authentication;

transmitting, from the server to the client device, a challenge data element;

signing, at the client device, the challenge data element using the private key;

transmitting, from the client device to the server, a signed version of the challenge data element; and authenticating, at the server, the user by validating the signed version of the challenge data element using a previously stored public key relating to the user, wherein the previously selected data element is stored remotely from the client device, wherein the forming of the key pair is re-initiated once the preselected lifetime has been preceded.

11. The method according to claim 10, further comprising the steps of:

receiving a user password from the user; and forming the hash version of the user password.

12. The method according to claim 10, wherein an electronic device is configured to communicate the previously selected data element to the client device upon a request from the client device.

13. The method according to claim 12, wherein the electronic device is wired or wirelessly connected to the client device.

14. The method according to claim 12, wherein the electronic device is a mobile phone.

15. An authentication system comprising at least a client device and an authentication server connected there-between using a network connection, each of the client device and the authentication server including one or more hardware processors, the authentication system configured for single sign-on of a user operating the client device, the authentication system configured for:

forming, at the client device, a key pair based on a user password, a previously selected data element and an ID of the user, wherein the key pair comprises a public and a private key, wherein the previously selected data element comprises a random bitstring individually selected by the user, and wherein the key pair has a preselected lifetime;

receiving, at the server, a request for authentication;

transmitting, from the server to the client device, a challenge data element;

signing, at the client device, the challenge data element using the private key;

transmitting, from the client device to the server, a signed version of the challenge data element; and authenticating, at the server, the user by validating the signed version of the challenge data element using a previously stored public key relating to the user, wherein the previously selected data element is stored remotely from the client device, wherein the forming of the key pair is re-initiated once the preselected lifetime has been preceded.

16. A computer program product comprising a non-transitory computer readable medium having stored thereon computer program means for a user operated client device and an authentication server in network connection there-between, wherein the computer program product comprises:

code for forming, at the client device, a key pair based on a user password, a previously selected data element and an ID of the user, wherein the key pair comprises a public and a private key, wherein the previously selected data element comprises a random bitstring individually selected by the user, and wherein the key pair has a preselected lifetime;

code for receiving a request for authentication;

code for transmitting a challenge data element;

code for signing the challenge data element using the private key;

code for transmitting a signed version of the challenge data element; and code for authenticating the user by validating the signed version of the challenge data element using a previously stored public key relating to the user, wherein the previously selected data element is stored remotely from the client device, wherein the forming of the key pair is re-initiated once the preselected lifetime has been preceded.

* * * * *